United States Patent [19]

Belanger

[11] Patent Number: 4,843,301

[45] Date of Patent: Jun. 27, 1989

[54] POWER SUPPLY WITH SWITCHING MEANS RESPONSIVE TO LINE VOLTAGE

[75] Inventor: Ernest D. Belanger, Bloomsbury, N.J.

[73] Assignee: OPT Industries, Inc., Phillipsburg, N.J.

[21] Appl. No.: 254,285

[22] Filed: Oct. 6, 1988

[51] Int. Cl.[4] ............................................... G05F 5/00
[52] U.S. Cl. .................................... 323/299; 363/143
[58] Field of Search ............... 323/258, 299, 301, 303; 363/142, 143

[56] References Cited

U.S. PATENT DOCUMENTS

| 4,090,234 | 5/1978 | Bierly | 323/258 X |
| 4,654,538 | 3/1987 | Lethellier | 323/299 X |
| 4,665,323 | 5/1987 | Russell et al. | 363/142 X |
| 4,714,870 | 12/1987 | Nilsson | 323/258 |
| 4,780,805 | 10/1988 | Chewuk et al. | 363/142 |

FOREIGN PATENT DOCUMENTS 2125194  2/1984  United Kingdom ........... 323/258 X

Primary Examiner—Patrick R. Salce
Assistant Examiner—Emanuel Todd Voeltz
Attorney, Agent, or Firm—Arthur L. Lessler

[57] ABSTRACT

A power supply circuit capable of operation with 115 V.A.C. (low range) or 230 V.A.C. (high range) line voltages, having a transformer with a primary winding arrangement which can be switched by a relay to accomodate either voltage range. A line voltage sensing circuit is coupled to a low voltage tap on the primary winding to sense the line voltage. When the line voltage is in the high range the voltage sensing circuit leaves the relay de-energized; and the sensing circuit energizes the relay to switch the primary winding to the appropriate configuration when the line voltage is in the low range.

7 Claims, 1 Drawing Sheet

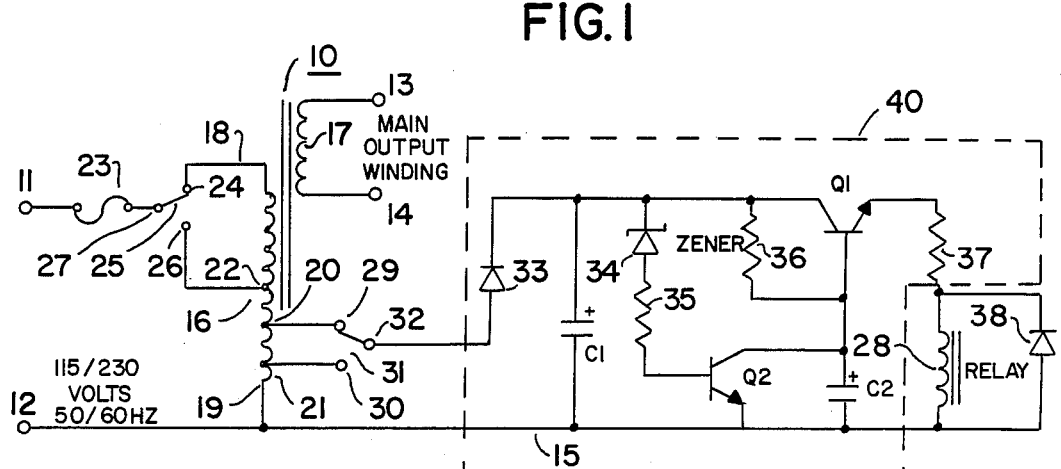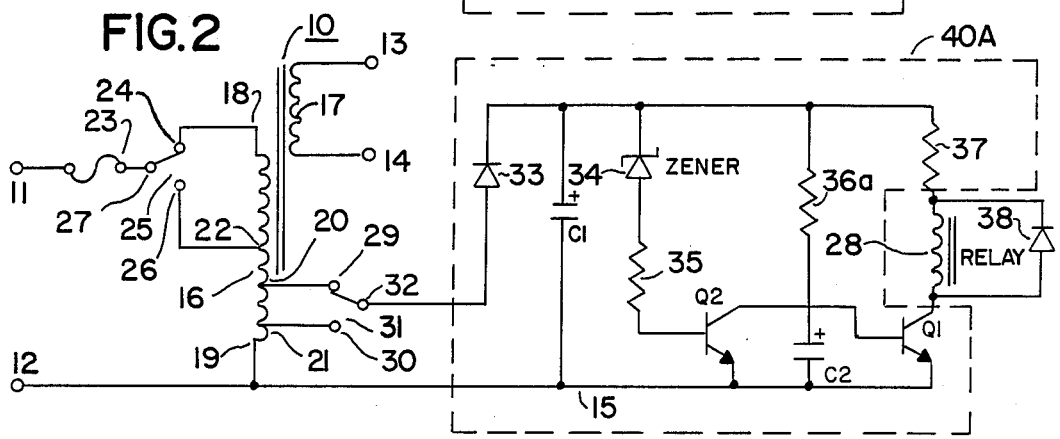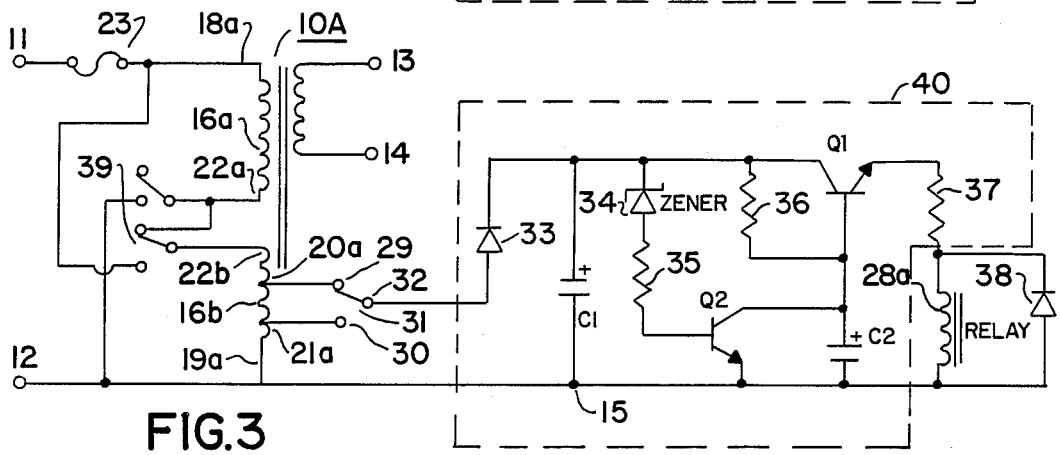

POWER SUPPLY WITH SWITCHING MEANS RESPONSIVE TO LINE VOLTAGE

BACKGROUND OF THE INVENTION

This invention relates to a circuit for supplying power to a load, which circuit is capable of operating from power sources which may have substantially different line voltages and which includes switching means responsive to the line voltage to which the circuit is connected.

Various devices have been and are available which are capable of operating from power sources which have substantially different line voltages. Of these, some devices with quite low power requirements (such as some electric shavers, for example) include wide range voltage regulators. Devices which operate at higher power levels have either a manually operable switching means for selecting the proper line voltage (typically 110–120 volts AC or 220–240 volts AC), or terminals to which different combinations of connections can be made to adapt to the different line voltages.

Accordingly, an object of the present invention is to provide a power supply having switching means which responds to line voltage, to adapt itself to the voltage of the particular power line to which the power supply is connected.

SUMMARY OF THE INVENTION

As herein described, there is provided a circuit for supplying power to a load. The circuit is capable of operating from power sources which may have substantially different line voltages. The circuit has first and second input terminals which can be connected to a power source which may have a line voltage in a predetermined high range or a predetermined low range. The circuit also has first and second output terminals which can be connected to a load. The circuit includes a power transformer with (i) a primary winding having first and second portions and at least three terminals, (ii) line voltage sampling means comprising at least two terminals for providing a voltage sample having a value corresponding to the voltage applied between two selected terminals of the primary winding; and (iii) output winding means having two terminals connected to corresponding ones of said output terminals.

Bistable switching means is provided having a first switching portion connected in circuit between at least one of said input terminals and at least two terminals of said primary winding, so that (i) when the switching means is in a first state said input terminals are coupled across at least one portion of said primary winding in a configuration such that the voltage at said output terminals is in a desired output range when said line voltage is in said predetermined high range, and (ii) when the switching means is in a second state said input terminals are coupled across at least one portion of said primary winding in a configuration such that the voltage at said output terminals is in said desired output range when said line voltage is in said predetermined low range.

A voltage sensing circuit is coupled to at least two terminals of the line voltage sampling means and is connected to the switching means for (i) causing said switching means to be in said first state when said voltage sample has a value corresponding to a value of said line voltage in said predetermined high range, and (ii) causing said switching means to be in said second state when said voltage sample has a value corresponding to a value of said line voltage in said predetermined low range.

With this arrangement, the circuit operates in such a way that the voltage at the output terminals is maintained within the desired output range regardless of whether the line voltage is in the predetermined high range or the predetermined low range.

IN THE DRAWING

FIG. 1 is a schematic diagram of a power supply according to a first embodiment of the invention, in which a relay is in the emitter circuit of a switching transistor and changes the output of a power transformer by switching a power source terminal to a tap on the primary winding of the power transformer;

FIG. 2 is a schematic diagram of a power supply according to a variation of that shown in FIG. 1, in which the relay is in the collector circuit of the switching transistor; and FIG. 3 is a schematic diagram of a power supply according to a second embodiment of the invention, in which the output voltage of the power transformer is changed by changing the primary wirings from a series-connected arrangement to a parallel-connected arrangement.

DETAILED DESCRIPTION

The power supply circuit shown in FIG. 1 is adapted to receive AC power from power supply terminals 11 and 12, and to deliver AC power to output terminals 13 and 14, which output terminals may be connected to a load (not shown). The circuit has a common bus 15 connected to terminal 12.

A power transformer 10 has a primary winding 16 and a secondary or main output winding 17. The ends of the secondary winding 17 are connected to respective ones of the terminals 13 and 14. The primary winding 16 has ends 18 and 19, a high voltage tap 22, and low voltage autotransformer output taps 20 and 21 which provide voltage samples having values corresponding to the voltage applied to the primary winding 16.

The end 18 of the power transformer 10 is connected to terminal 24 of a first SPDT contact set 25 of the relay 28, while tap 22 of the transformer is connected to terminal 26 of the relay contact set 25. The common terminal 27 of contact set 25 is connected to power source terminal 11 through a fuse 23. The end 19 of the primary winding of the power transformer 10 is connected to the common power source terminal 12.

Low voltage taps 20 and 21 are connected to terminals 29 and 30 respectively of a second SPDT contact set 31 of the relay 28. The common contact 32 of the SPDT contact set 31 is connected to a voltage sensing circuit 40 (FIGS. 1 and 3) or 40A (FIG. 2). More specifically, the common terminal 32 is connected through a diode 33 to the positive terminal of a filter capacitor C1, the other end of capacitor C1 being connected to the common bus 15.

A Zener diode 34 and resistor 35 are connected in series between the positive terminal of capacitor C1 and the base of a first NPN transistor Q2, the emitter of Q2 being connected to the common bus 15. A resistor 36 has one end connected to the positive terminal of capacitor C1 and the other end connected to the positive terminal of a capacitor C2, the other terminal of capacitor C2 being connected to the common bus 15. The positive terminal of capacitor C2 is also connected to the collector of transistor Q2.

A second NPN transistor Q1 has its collector connected to the positive terminal of capacitor C1 and its base connected to the positive terminal of capacitor C2. A current limiting resistor 37 (optional) is connected between the emitter terminal of transistor Q1 and one coil terminal of relay 28, the other coil terminal of relay 28 being connected to the common bus 15. A (normally reverse biased) diode 38 is connected across the coil terminals of relay 28, to provide a discharge path for the coil current when the collector-emitter path of transistor Q1 becomes nonconductive.

The voltage sensing circuit 40A of FIG. 2 is similar to the voltage sensing circuit 40 of FIGS. 1 and 3, except that whereas in FIGS. 1 and 3 the collector-emitter path of transistor Q1 is positioned between the positive terminal of capacitor C1 and the resistor 37, in FIG. 2 the collector-emitter path of transistor Q1 is positioned between the common bus 15 and the coil of the relay 28. In both arrangements, however, the collector-emitter path of transistor Q1 is effectively in series with the coil of the relay 28.

The circuit of FIG. 3 is similar to that of FIG. 1, except that whereas the transformer 10 in FIG. 1 has a single primary winding 16 (with the tap 22 effectively dividing the primary winding into two portions), the transformer 10A in FIG. 3 has two primary winding sections 16a and 16b, which can be connected in series or in parallel across the power line terminals 11 and 12, depending upon the position of the DPDT contact set 39 of the relay 28a.

In the operation of the circuits shown in FIGS. 1, 2 and 3 the collector-emitter path of the transistor Q1 is rendered conductive or nonconductive in response to the voltage at the common terminal 32 of the SPDT contact set 31, which voltage is a measure of the line voltage between the power line terminals 11 and 12; which line voltage may have a value in one of two substantially different voltage ranges, e.g. 220-240 V.A.C. (high range) or 110-120 V.A.C. (low range).

High Line Voltage Range Operation

When the line voltage is in the high range transistor Q1 is nonconductive and therefore no current flows through the coil of relay 28, so that the relay is not actuated; and the relay contact sets 25/31 of FIGS. 1 and 2 and 39/31 of FIG. 3 are in the positions shown in the drawing.

The contact set 25 therefore connects the line voltage at input terminals 11/12 across the entire primary winding 16 of transformer 10 (FIGS. 1 and 2); which primary winding may be considered as having a first portion extending between terminals 18 and 22 and a second portion in series therewith extending between terminals 22 and 19. This connection results in the output voltage between terminals 13 and 14 having a value within a desired output range when the line voltage is in its high (220-240 V.A.C.) range.

Similarly, when current is not flowing through the coil of relay 28, the contact set 39 connects the line voltage at input terminals 11/12 across a series combination of the first and second portions 16a and 16b of the primary winding of transformer 10A (FIG. 3). This connection results in the output voltage between terminals 13 and 14 having a value within a desired output range when the line voltage is in its high range.

Low Line Voltage Range Operation

When the line voltage is in the low range transistor Q1 is rendered conductive and therefore allows current to flow through the coil of relay 28, so that the relay is actuated; and the relay contact sets 25/31 of FIGS. 1 and 2 and 39/31 of FIG. 3 are in the positions opposite to those shown in the drawing. That is, in SPDT contact set 25 terminal 27 is connected to terminal 26 (FIGS. 1 and 2); the DPDT contact set 39 is in it lower position (FIG. 3); and terminal 32 the SPDT contact set 31 is connected to terminal 30 thereof (FIGS. 1 to 3).

The contact set 25 therefore connects the line voltage at input terminals 11/12 across the second portion of the primary winding 16 of transformer 10 (FIGS. 1 and 2), i.e. the portion extending between terminals 22 and 19. This connection results in the output voltage between terminals 13 and 14 having a value within the desired output range when the line voltage is in its low (110-120 V.A.C.) range.

Similarly, when current is flowing through the coil of relay 28, the contact set 39 connects the line voltage at input terminals 11/12 across a parallel combination of the first and second portions 16a and 16b of the primary winding of transformer 10A (FIG. 3). This connection results in the output voltage between terminals 13 and 14 having a value within the desired output range when the line voltage is in its low range.

Circuit Operation Detail—High Line Voltage Range

The voltage sensing circuit 40 operates by responding to the voltage sample at low voltage tap 20 of transformer 10 (FIGS. 1 and 2) or low voltage tap 20a of transformer 10A (FIG. 3).

When the voltage sample (which is coupled to common terminal 32 of the SPDT contact set 31) has a value corresponding to the high line voltage range, transistor Q1 is initially prevented from turning on by the time delay in charging capacitor C2 (through resistor 36), so that capacitor C2 initially keeps the emitter-base voltage of Q1 too low to allow Q1 to become conductive. Before capacitor C2 is charged to a voltage sufficient to allow transistor Q1 to become conductive, capacitor C1 is charged (through diode 33) to a voltage sufficiently high to fire the Zener diode 34. As soon as Zener diode 34 fires, it conducts sufficient current (via resistor 35) to turn transistor Q2 on, thus discharging capacitor C2 and keeping the emitter-base voltage of transistor Q1 too low to allow transistor Q1 to become conductive; and therefore preventing current from flowing through the coil of relay 28.

This condition persists so long as the line voltage is within the high range; so that the line voltage is applied to the transformer primary winding connections corresponding to the high range line voltage, to provide an output voltage at terminals 13 and 14 within the desired output range.

Circuit Operation Detail—Low Line Voltage Range

When the voltage sample (which is coupled to common terminal 32 of the SPDT contact set 31) has a value corresponding to the low line voltage range, transistor Q1 is again initially prevented from turning on by the time delay in charging capacitor C2, so that capacitor C2 initially keeps the emitter-base voltage of Q1 too low to allow Q1 to become conductive. However, as soon as capacitor C2 is charged to a voltage sufficient to allow transistor Q1 to become conductive, transistor Q1 turns on and allows current to flow through the coil of relay 28 (via resistor 37). Since the value of the voltage sample corresponding to the low line voltage range is not sufficient to fire Zener diode 34, transistor Q2 is nonconductive and does not discharge capacitor C2.

When current flows through the coil of relay 28, the relay is actuated and switches contact sets 25/31 (FIGS. 1 and 2) or 39/31 (FIG. 3) to their actuated positions. The value of capacitor C1 is sufficiently high to sustain sufficient voltage to keep the relay coil energized during the switching interval of the relay contact set 31.

Contact set 25 now connects the line voltage across only the second portion of the primary winding 16 of transformer 10, i.e. the portion between terminals 16 and 19 thereof (FIGS. 1 and 2); and contact set 39 now connects the line voltage across a parallel combination of primary winding portions 16a and 16b (FIG. 3). These connections result in the output voltage at terminals 13 and 14 being within the desired output range when the line voltage is in its low range.

At the same time, the flow of current through the coil of relay 28 switches the contact set 31 so that the voltage sensing circuit 40 or 40A is connected to the tap 21 or 21a of the transformer 10 or 10A, so as to somewhat reduce the value of the voltage sample corresponding to the low range of the line voltage, in order to (i) keep the relay coil voltage at a somewhat lower value to reduce power consumption by the relay 28 and to preventing excessive heating of the coil, thereby increasing the life of the relay, and (ii) reduce the voltage sample to a value so as to insure that the Zener diode 34 will not be caused to fire by line voltage fluctuations at the high end of the low range.

This condition persists so long as the line voltage is within the low range; so that the line voltage is applied to the transformer primary winding connections corresponding to the low range line voltage, to provide an output voltage at terminals 13 and 14 within the desired output range.

The voltage sensing circuit 40 or 40A may preferably be designed to work with a relay 28 having a nominal coil voltage of 26 volts, although any other desired voltage can be employed.

In FIGS. 1 and 2 switching of transformer connections is accomplished by switching to and from a tap on the primary winding; and in FIG. 3 switching is accomplished by switching between series and parallel connections of the primary winding portions. If desired, other switching arrangements can be employed for switching between other transformer winding combinations.

In the preferred embodiments described, an isolated secondary winding 17 is used to supply the output power. However, if desired the output power could be obtained from the primary winding in an autotransformer arrangement.

I claim:

1. A circuit for supplying power to a load, said circuit being capable of operating from power sources which may have substantially different line voltages, said circuit comprising:

first and second input terminals adapted to be connected to a power source which may have a line voltages in a predetermined high range or a predetermined low range;

first and second output terminals adapted to be connected to a load;

a power transformer with (i) a primary winding having first and second portions and at least three terminals, (ii) line voltage sampling means comprising at least two terminals for providing a voltage sample having a value corresponding to the voltage applied between two selected terminals of said primary winding; and (iii) output winding means having two terminals connected to corresponding ones of said output terminals;

bistable switching means comprising a relay having an actuating coil, said switching means having a first switching portion connected in circuit between at least one of said input terminals and at least two terminals of said primary winding, so that (i) when said switching means is in a first state said input terminals are coupled across at least one portion of said primary winding in a configuration such that the voltage at said output terminals is in a desired output range when said line voltage is in said predetermined high range, and (ii) when said switching means is in a second state said input terminals are coupled across at least one portion of said primary winding in a configuration such that the voltage at said output terminals is in said desired output range when said line voltage is in said predetermined low range; and a voltage sensing circuit coupled to said at least two terminals of said line voltage sampling means and connected to said switching means for (i) causing said switching means to be in said first state when said voltage sample has a value corresponding to a value of said line voltage in said predetermined high range, and (ii) causing said switching means to be in said second state when said voltage sample has a value corresponding to a value of said line voltage in said predetermined low range, said voltage sensing circuit comprising:

a first transistor having two main electrodes and a control electrode, said coil being connected in series with said main electrodes for actuating said relay when said first transistor is conductive between the main electrodes thereof;

a capacitor connected to the control electrode of said first transistor for initially limiting the voltage at said control electrode to a value insufficient to render said first transistor conductive between the main electrodes thereof;

means coupled between said line voltage sampling means and said capacitor for charging said capacitor; and means coupled to said line voltage sampling means for discharging said capacitor when the value of said voltage sample corresponds to a line voltage in said predetermined high voltage range, to limit the voltage at said control electrode to a value insufficient to render said first transistor conductive between the main electrodes thereof, so long as said line voltage is in said predetermined high voltage range thereof, whereby the voltage at said output terminals is maintained within said desired output range regardless of whether said line voltage is in said predetermined high range or said predetermined low range.

2. The circuit according to claim 1, wherein said output winding means comprises a secondary winding separate from said primary winding.

3. The circuit according to claim 1, wherein said line voltage sampling means comprises a portion of said primary winding defined by at least one tap thereon.

4. The circuit according to claim 3, wherein said line voltage sampling means comprises taps on said primary winding for supplying a first line voltage sample and a second line voltage sample having a voltage lower than that of said first line voltage sample.

5. The circuit according to claim 1, wherein said primary winding has two end terminals and a third terminal connected to a tap on said primary winding, said switching means (i) coupling said input terminals to corresponding ones of said end terminals in said first state thereof, and (ii) coupling said input terminals to corresponding ones of said tap and one of said end terminals in said second state thereof.

6. The circuit according to claim 1, wherein said switching means connects said first and second primary winding portions (i) in series in said first state thereof, and (ii) in parallel in said second state thereof.

7. The circuit according to claim 1, wherein said capacitor discharging means comprises a second transistor having two main electrodes and a control electrode, and a Zener diode, the main electrodes of said second transistor being connected across the terminals of said capacitor, said Zener diode being coupled in circuit between said line voltage sampling means and the control electrode of said second transistor.

* * * * *